May 4, 1943. J. A. SPAHN 2,318,430
GRASS TRIMMER
Filed Jan. 8, 1942

Inventor:
Joseph A. Spahn
By Milo B. Stevens & Co.
Attorneys.

Patented May 4, 1943

2,318,430

UNITED STATES PATENT OFFICE 2,318,430

GRASS TRIMMER

Joseph A. Spahn, Chicago, Ill.

Application January 8, 1942, Serial No. 426,082

9 Claims. (Cl. 56—25.4)

My invention relates to grass trimmers of the type used in parks, cemeteries and other grounds where close work around monuments and other objects is required, and my main object is to provide a guard for such a trimmer which protects the operator from contact with the grass cutter.

A further object of the invention is to design the novel guard so that it will allow the free passage or clearance of the grass over which the trimmer is moved, so as not to create any snag or impede the action of the grass cutter.

Another object of the invention is to construct a guard of the above character which has a set of ground elements designed in a manner to ease the passage of the trimmer over the grass and raise the inner portion of the guard to an extent affording ample clearance for the grass in the corresponding region.

An important object of the invention is to construct the guard along lines of simplicity and rigidity.

With the above objects in view and any others which may suggest themselves from the description to follow, a better understanding of the invention may be had by reference to the accompanying drawing, in which—

Figures 1, 3:
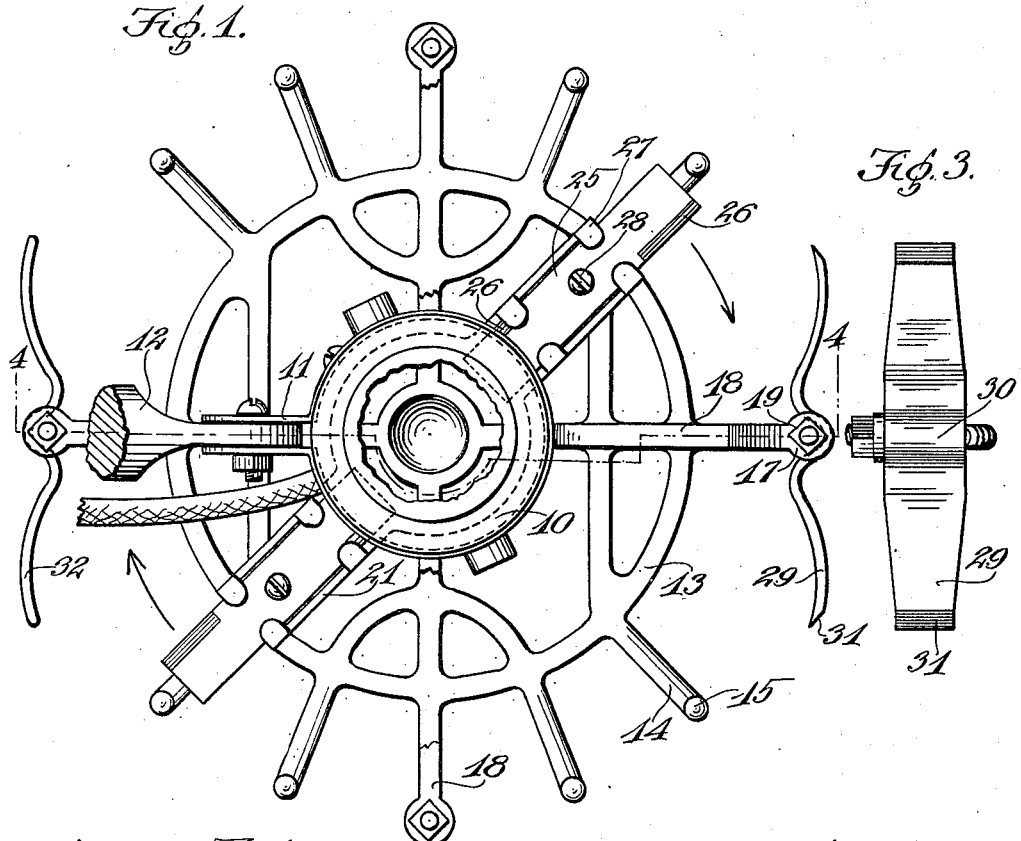
Fig. 1 is a top plan view of the novel trimmer with some portions broken away.
Fig. 3 is a side view of an element shown in the right hand extremity of Fig. 1.

Grass trimmers of the type herein considered employ a vertical motor, such as is indicated at 10, the motor receiving a clamp 11 to make an adjustable connection with an inclined stick or handle 12 by means of which the trimmer is pushed over the ground. The motor carries a spinning cutter below, and a guard is provided to shield the cutter against contact with surrounding objects. As it is necessary for the cutter to have free access to the grass to be trimmed, the guard must be made so that it permits this access while serving to protect the cutter from external objects. Such trimmers as have come to my attention have not combined the two conditions efficiently, so that where the cutter would have a free path, it was often exposed to contact with external objects, particularly the shoes or feet of the operator at such time as they would get close to the guard. Or, where the blade was more amply protected the guard was of a type which easily snagged or packed clumps or grass in the active zone of the cutter, so that the latter or the free progress of the trimmer over the grass was hampered. It has therefore been my intention to construct a guard which combines ample access of the cutter to the grass, while protecting the cutter against injury from external objects and rendering the shoes or feet of the operator safe against injury from the cutter.

The improved guard is essentially in the form of a circular plate 13 which has an openwork or skeleton design, although the internal portion of the plate may be more solid if desired.

The plate 13 is extended outwardly with a series of fingers 14 bent with upward stems 15. The stems occurring at four equidistant points are threaded as indicated at 16 to receive eyes 17 forming the outer extremities of a series of brackets 18 directed radially from the motor clamp 11. The application of nuts 19 to the threaded portions 16 serves to secure the guard to the brackets 18.

Figures 2, 4:
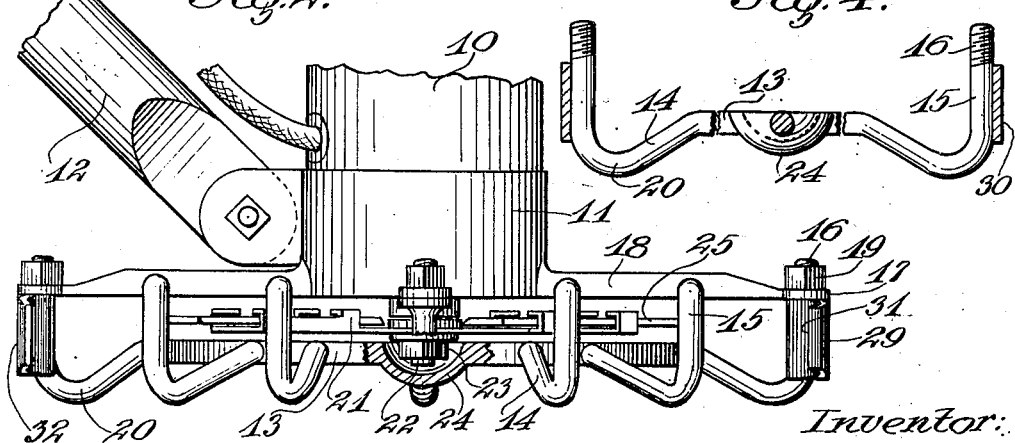
Fig. 2 is a front elevation, with a central portion in section.
Fig. 4 is a section substantially along the line 4—4 of Fig. 1 and contracted by being partly broken away.

The stems 15 are formed roundedly from the fingers 14 as indicated at 20; and the fingers rise from the bends 20 to place the plate 13 at an elevation from the bottom of the finger group, as indicated in Fig. 2.

While the plate 13 is in an elevated position as mentioned, it is sufficiently spaced from the bottom of the motor to permit the interposition of the cutter 21, the same being suitably mounted on the motor shaft 22 and secured by a nut 23. Thus, the cutter 21 has ample spinning clearance from above and below as well as sufficient end clearance in relation to the cluster of guard stems 15.

In order that the plate 13 may clear the bottom fastening of the cutter 21, the plate is depressed with a cup formation 24 in the center, such formation providing ample clearance for the purpose as indicated in Fig. 2.

While any type of blades may be used for the cutter, I prefer to employ a double-edged blade 25, that is, with beveled edges 26 on alternate sides at the ends, the cutter having guide flanges 27 for the sliding of the blade and receiving a screw 28 to fasten the same. When the outer edge of the novel blade has dulled it is a simple matter to remove the screw 28, and reverse the blade to present the other edge in the working area, so that in this manner the sharpening or replacement of blades becomes less frequent.

A trimmer of the above type is manipulated from side to side like a scythe while being advanced, and the guard so far as described is substantially satisfactory. However, in order to fortify the guard as the forward end in a manner to protect the blade in case a monument or other object is struck, the forward stem 15 receives a leaf type of guarding element 29, the middle portion 30 of this element being welded to the stem, while the outer portions extend with curves terminating with pointed edges 31 in rearward directions. A similar guarding element 32 is applied to the rearmost stem 15 to protect the shoe or foot of the operator in case it has advanced too close to the trimmer.

In the use of the improved trimmer, the bottom bends 20 form simple ground contacts and rounded traction units to reduce the ground friction of the machine to a minimum and make it easy to propel or swing the same. In addition, the inward rise of the fingers 14 raises the plate 13 to a sufficient height to clear or easily ride over the grass occurring within the area of the guard. While the plate may be more or less flat, it is preferred that the fingers 14 be of round cross-section so that they may easily ride over the grass.

The frontal guarding unit 29 furnishes a solid or complete front in case the base of a monument or other hard object is struck, so as to positively prevent the knives of the cutter from meeting such monument or object; and the pointed ends 31 of the unit 29 deflect the grass occurring near the point of contact, so that such grass may enter within the trimming zone. It goes without saying that the rear guarding unit 32 also furnishes an ample barrier to the advance of the shoes or feet of the operator in the forward direction. Further, the fact that the front and rear guard units extend in transverse directions and are relatively thin enables them to pass through the grass without appreciable resistance as the machine is swung from side to side for the grass trimming operation. Finally, it will be noted that the series of stems 15 join with the guarding units 29 and 32 to make all the side openings in the guard equal, so that at no point is there any opening so large as to admit the shoe or ankle of the operator into the path of the rotary cutter in case the shoe or ankle comes in contact with the guard.

It will be evident from the above description that I have provided a guard for the particular type of grass trimmer which not only affords an ample clearance for the free passage of grass negotiated by the trimmer, but also presents a circle of barriers which protect the cutter against external objects and the operator's shoe or foot from injury by the cutter. It must be appreciated that the hazard to the cutter or the operator does not come from above or below, but from the sides, and the series of stems 15 is thus similar to a circle of fence pickets and therefore located where the hazard occurs. Also, it is sufficient that the stems 15 just extend and point upwardly and without inward connections at the top, the absence of such connections leaving a maximum clearance for the grass in the zone of the cutter. A machine is thus had which combines maximum trimming efficiency with a high factor of safety to the machine and the operator.

While I have described the invention along specific lines, various minor changes and refinements may be made without departing from its principle, and I desire to consider all such changes and refinements as coming within the scope and spirit of the appended claims.

I claim:

1. A grass trimmer comprising a motor, a shaft extending downwardly therefrom, a rotary cutter mounted on the shaft and having outwardly-projected blades, a guard plate below the cutter, an outer series of upstanding barrier elements carried by the guard plate, and means to support the guard plate from the motor.

2. The structure of claim 1, said barrier elements comprising the outer terminals bent roundedly from a series of fingers projecting outwardly from the plate.

3. The structure of claim 1, said barrier elements comprising the outer terminals bent roundedly from a series of downwardly-deflected fingers projecting outwardly from the plate.

4. The structure of claim 1, the guard being circular, and said series of barrier elements being in substantially concentric relation with the guard.

5. The structure of claim 1, and wide barrier means carried by such of said elements as are located at the front and rear of the trimmer.

6. The structure of claim 1, said means comprising brackets from the motor to a number of widely-distributed and equally-spaced ones of said elements.

7. The structure of claim 1, said barrier elements being upstanding stems formed with rounded base portions for ground contact and connected to the plate by rising fingers to raise the plate from the ground.

8. The structure of claim 1, and means under the cutter to secure it on the motor shaft, the plate being depressed under said securing means to clear the same.

9. The structure of claim 1, said series being interrupted at the front and rear of the trimmer, and wide frontal and rear barriers spacedly interposed between the corresponding interrupted portions of the element series.

JOSEPH A. SPAHN.